Figure 1:

A. Barbarin,
Bale Tie.

No. 66,065.    Patented June 25, 1867.

Witnesses:
A. Magnuno
Rufus R. Rhodes

Inventor:
Arthur Barbarin

UNITED STATES PATENT OFFICE.

ARTHUR BARBARIN, OF NEW ORLEANS, LOUISIANA.

IMPROVEMENT IN FASTENING THE ENDS OF COTTON-TIES.

Specification forming part of Letters Patent No. 66,065, dated June 25, 1867.

*To all whom it may concern:*

Be it known that I, ARTHUR BARBARIN, of the city of New Orleans, parish of Orleans, and State of Louisiana, have invented a certain new, useful, and improved device for fastening the ends of wire-rope or wire together when the same is used for banding cotton or other bales; and I do hereby declare the following to be a full, clear, and exact description of the same, reference being had to the annexed drawings, making a part of this specification.

My invention consists of a cast or malleable iron connecting-link, about two inches long, one inch wide, and half an inch thick at its thickest part, to which the two ends of the wire-rope are fastened by means of loops that are formed thereat by simply twisting the same around that part of the wire-rope which sustains the tension, and so constructed or formed that said loops are caused to assume and preserve a regular symmetrically-curved form, thus preventing the wire-rope from being injured by short or abrupt bends at the points of connection with said device. But my invention will be better understood by referring to the drawings.

The device, as a whole, is marked A upon the drawings at all the figures.

Figure 2:

At Figures 1 and 2 the device is shown with the curved supports *a* at either end thereof, without groove or concave bed around it. At Fig. 1 there is no opening on either side of the device, and hence, in the practice of the invention, the wire-rope must be passed through the opening *b* between the said curved supports. This may be done at the time the operation of banding the bale is performed, or one end of the wire-rope may be attached to the device prior to that operation. Fig. 2 is precisely similar to Fig. 1, excepting that, instead of having closed sides, there is an opening, *c*, on one side, which allows of the slipping of the loops over or upon the curved supports after they have been formed. The side in which opening *c* is made may be placed next the bale, or the reverse side may be thus placed; but I prefer having the opening next the bale, in order to prevent all contingency of disconnection from the slackening of the tension from any sudden or accidental concussion or compression of the bale.

Figure 3:
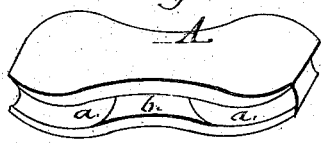
Figure 4:

At Figs. 2 and 4 the device conforms precisely in every particular but one with the representations at Figs. 1 and 2. The one point of difference is, that while in the latter the curved supports *a* have a plane or even surface, in the former they are grooved in such a manner as to present a concave bed, into which the wire-rope fits snugly. In Fig. 3, as in Fig. 1, the wire-rope must be passed through the openings *b*, and the loops formed afterward, whereas in Fig. 4, as in Fig. 2, the loops may be formed before they are attached to the device.

Figure 5:
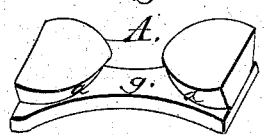

At Fig. 5 the curved supports *a* have no overlapping projection *d*, as in Figs. 2 and 4; and the supporting-surface inclines in such a manner as to tend to jam the enveloping loops into the concentric angular space between such inclined surface and the part *g* of the device, and thus prevents all danger of the loops slipping off. In this form of the device, as in Figs. 2 and 4, either side may be placed next the bale; but I prefer in this, as in those forms, to place the open side next the bale, and thus to make it impossible for the loops to slip off.

Figure 6:
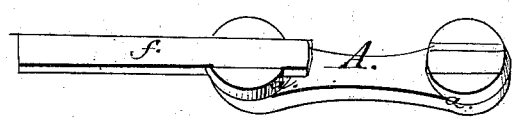

At Fig. 6 the device has an open side, which may be closed by a sliding bar, *f*, after the wire-rope has been passed around the supports *a*. This sliding bar may be made longer than the device, and so thin as that it may be bent over the ends of the device, and thus be prevented from slipping out after the loops are in position.

My device is especially designed to be used in connection with wire-rope; but it is obviously as well adapted to wire, and hence I reserve the right to use it with wire.

Among the many advantages possessed by my invention over any other of which I have any knowledge, it will be sufficient herein to specify two, and these are, that it can be manufactured at less cost than any other, and that it does not necessitate the cutting of the wire to take it off the bale, and thus preserves the wire to be applied again to another and another bale, until, from long and repeated use, it is worn out.

Having thus described my invention, what I claim, and desire to secure by Letters Patent, is—

The device A, when constructed as herein described, for the purpose set forth.

ARTHUR BARBARIN.

Witnesses:
A. MAZUREAU,
RUFUS R. RHODES.